Feb. 19, 1935. F. SINGER Re. 19,474

HOT EXTRUSION METHOD

Original Filed Sept. 28, 1931

Inventor

Fritz Singer;

By Pennie Davis Marvin & Edmonds

Attorney

Reissued Feb. 19, 1935

Re. 19,474

UNITED STATES PATENT OFFICE 19,474

HOT EXTRUSION METHOD

Fritz Singer, Nuremberg, Germany, assignor to Tubus A. G., Zurich, Switzerland

Original No. 1,892,789, dated January 3, 1933, Serial No. 565,709, September 28, 1931. Application for reissue January 2, 1935, Serial No. 191. In Germany May 31, 1929

2 Claims. (Cl. 207—10)

Figure 1:
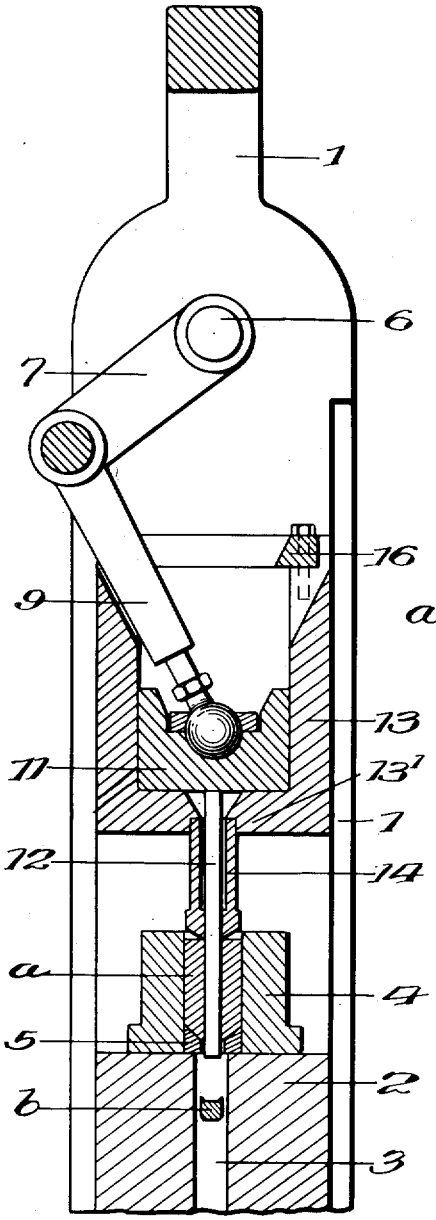

My invention pertains to the hot extrusion process as applied to metals requiring to be extruded at high temperatures, such, for instance, as copper, brass, iron and steel, and has as its object the production from such metals of seamless tubes and solid shapes of extremely small wall thicknesses or cross sections, which, so far as I am aware, has not heretofore been accomplished in a commercially practicable way.

The hot extrusion process, sometimes known as the Dick process, has been known for many years, and was carried on, until recently, by the use of hydraulic presses. These hydraulic presses operate at a low extruding speed, one-half inch of billet length per second having heretofore been considered a high speed for such a press. As thus practiced, the process was capable of producing tubes and solid shapes, but only under strict limitations with regard to the hardness of the metal and the cross sectional area of the extruded product. It was discovered that by increasing the extruding speed up to that speed which was given by the use of mechanical, as distinguished from hydraulic, presses,—being a speed of between 3 and 5 inches of billet length per second,—the scope of the process was greatly enlarged so as to make it possible, for instance, to extrude not only iron but even alloy steels especially resistant in the hot state, such as the stainless nickel-chromium-iron alloys, etc.

By the carrying on of the hot extrusion process at a billet-extruding speed of between 3 and 5 inches per second, such as is obtained from the use of known mechanical presses, it is possible to produce practicably, from brass containing 63% of copper, tubes of a wall thickness as low as about .03 inch, and, from steel, tubes of a wall thickness of as low as about .08 inch. Tubes of even smaller wall thicknesses could be produced, but only at the sacrifice of great wear and tear of the extruding tools. Thus economical considerations imposed a limit, depending upon the metal being employed, as to the smallness of the cross sectional area of the extruded article which could be practicably obtained. As a result, when it was desired to produce tubes of exceptionally small wall thickness, or solid shapes of exceptionally small cross sectional area, it became necessary first to produce the articles in a larger cross sectional area and then reduce them, as by the well known drawing process, or the like. Tubes of very small wall thickness, and solid shapes of very small cross section, could be produced direct by the cold extrusion process, sometimes known as the Lee and Hooker process, but such process was only available for metals of high ductility and was capable of producing articles of only very short lengths. Thus, so far as I am aware, it has not been possible to produce, by a single extruding step, articles of substantial length and having an exceedingly small wall thickness or cross sectional area from such metals as copper, brass, iron, steel, etc.

The obstacle to producing articles of small cross sectional area in the carrying on of the hot extrusion process at the speeds obtained by the use of mechanical press,—i. e., from about 3 to 5 inches per second,—was the wear and tear to which the tools were subjected, which wear and tear exceeded the limits possible in economical production. The expectation of those skilled in the art was that any increase of this extruding speed would still further increase this wear and tear of the tools. From the pressure and speed diagram of a crank actuated press it is seen that an increase of the pressing speed causes an increase of the pressure force. With a crank press operating at its normal speed of from 3 to 5 inches per second the tools are subjected to extremely high pressures, up to 100,000 pounds per square inch and more. Considering this, and that the extrusion of iron is executed at temperatures up to 1450° C. and that the tools consequently must be considerably heated, it seemed entirely hopeless to increase the extruding speed and thereby to increase materially the already high pressure upon the surface of the billet. All reasonable considerations indicated that if this were tried, in the attempt to extrude articles of exceptionally small cross sectional area, a still further increased wear and tear of the tools would be the only result.

I have discovered, however, and therein my invention consists, that, contrary to all expectations, an increase of the billet extruding speed beyond that of the known mechanical presses adapted for this work permits articles of exceedingly small wall thicknesses or cross-sectional area to be extruded smoothly, and without the tools being subjected to the excessive wear and tear which occurs in extruding such articles at the normal speed of mechanical presses,—i. e., from 3 to 5 inches of billet length per second. I have found that this increased extruding speed is available for billets the height of which is from 2 to 2½ times their diameter.

A possible explanation of this phenomenon may be that, though any considerable increase of the extruding speed would necessarily be followed by an increase of the pressure upon the surface of the billet, which would be expected to result in an increase of the resistance of the billet against being extruded, nevertheless the greatly increased speed of the passage of the metal through the restricted die aperture leaves no time for appreciable cooling of the metal at that point. The cooling of the metal at the point of passage through die aperture is a main cause for resistance of the billet against extrusion. Therefore it may be that the reduction of the billet resistance, due to the lessening of the opportunity for the metal to cool in the die aperture, more than offsets the increased pressure applied to the surface of the billet because of the increased speed of the extruding tool. In that case there would be less resistance by the billet to extrusion with the high speed of the extruding tool than with the normal speed of from 3 to 5 inches of billet length per second. This would explain the fact that exceptionally small cross-sections can be extruded at the high speed without prohibitory wear and tear of the tools, but not at the normal speed.

Figure 2:
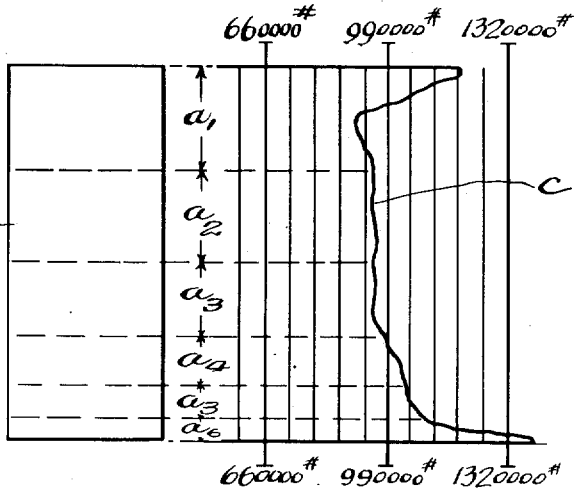

As an example, a specific instance of the practice of my improved method is given below, with reference to the accompanying drawing, in which Fig. 1 is a sectional elevation of an extrusion press, and Fig. 2 is a diagram showing successive positions of the extruding plunger at successive equal intervals of time (quarter seconds), and the pressures exerted by the plunger at such positions.

The press shown in the drawing is a crank press of the character disclosed by my prior Patent 1,773,464, in which the actual extruding operation is conducted during the second quadrant of the crank cycle, but the method may be practiced with crank presses of other characters, for instance, such as that disclosed by another of my patents, No. 1,839,421, in which practically the whole stroke of the crank press is employed in the extruding operation. Also presses other than crank presses can be employed,—for instance, hydraulic presses, providing that they are constructed to permit of the required pressing speed and pressure force.

The particular form of press shown in the drawing comprises a frame 1 carrying, at the lower part thereof, a fixed table 2 formed with a central bore 3 to accommodate the extruded article. Upon the table is mounted a billet container 4, carrying, at its lower end, the matrix die 5. In the upper part of the press frame is mounted a suitably driven crank shaft 6, upon which is a crank 7. A pitman 9 is connected at one end to the crank and at the other end to a mandrel-carrier 11 to which is secured a downwardly extending mandrel 12. The mandrel-carrier takes the form of a piston slidably mounted in a plunger-carrier 13 from which a hollow plunger 14, adapted to contain the mandrel 12, extends downwardly. Relative movement between the mandrel-carrier and the plunger-carrier is limited, at the lower end, by the bottom wall 13′ of the plunger-carrier, and at the upper end, by a ring 16 secured to the plunger-carrier adjacent the top thereof.

A billet, designated *a*, is placed in the container 4 and the press set in operation. As the crank 7 revolves, the plunger-carrier and mandrel-carrier will descend together until the plunger contacts with the top of the billet, whereafter the mandrel-carrier will descend alone, the mandrel passing through the plunger and piercing the billet so as to drive out therefrom a small plug, which plug is designated *b* on the drawing. During the piercing of the billet, the latter will swell upwardly somewhat, this being accommodated by the loose connection between the plunger-carrier and mandrel-carrier. When the billet has been pierced, the lower face of the mandrel-carrier will come into engagement with the bottom wall 13′ of the plunger-carrier, whereupon the plunger-carrier will be forced downwardly by the crank and the billet extruded.

The following is one example of temperature, speed, and pressure, according to which tubes of exceptionally small wall thickness can be extruded. The billet, prior to being inserted into the container 4, is heated to 1270° C. The press, which has a crank stroke of 43.3″, is rotated at 6.2 revolutions per minute. The diameter of the billet, before piercing by the mandrel, is 3.94″ and its height 8.65″. After piercing, the billet diameter is 4.05″ and its height 9.05″. Extrusion begins in the second quadrant of the crank cycle, at about 56° before the lower dead center of the crank, which, at the given crank speed, means that the extrusion will be conducted in 1.5 seconds, or, with the billet height of 8.65″, at an average speed of about 6″ per second.

The pressure exercised by the plunger at the various stages of the extrusion will be understood from the pressure and speed diagram constituting Fig. 2. In this figure, the billet, *a*, is divided into six planes, the distances $a^1$—$a^6$ between which represent the movements of the plunger during successive periods of ¼ second each. Placed opposite the diagram of the billet is a curve, *c*, showing the pressure exercised by the plunger at each of the six stages of its descent. From the diagram it is to be seen that, upon initiating the flow of the metal the pressure instantaneously rises to about 1,200,000 lbs., that it thereafter decreases to about 900,000 lbs., that it does not vary essentially during the second and third stages, $a^2$ and $a^3$, of the extrusion, and that it increases gradually in the fourth and fifth stages, $a^4$ and $a^5$, and rapidly during the sixth stage, $a^6$, due to the extreme cooling of the extrusion residue towards the end of the extruding operation.

I claim:

1. The method of producing by hot extrusion solid and hollow articles from metals and alloys requiring to be extruded at high temperatures comprising the steps of placing in a container a billet of such metal the length of which is from two to two and one-half times its diameter and applying pressure thereto by means of an extruding tool moving at an average speed in excess of five inches per second, thereby to extrude the metal of the billet from the container at an average speed in excess of five inches of billet length per second.

2. The method of producing by hot extrusion solid and hollow articles from metals and alloys requiring to be extruded at high temperatures comprising the steps of placing in a container a billet of such metal and applying pressure thereto by means of an extruding tool moving at an average speed in excess of five inches per second, thereby to extrude the metal of the billet from the container at an average speed in excess of five inches of billet length per second.

FRITZ SINGER.